United States Patent
Peacock et al.

(10) Patent No.: US 7,577,624 B2
(45) Date of Patent: Aug. 18, 2009

(54) CONVERGENT CONSTRUCTION OF TRADITIONAL SCORECARDS

(75) Inventors: Gavin Peacock, Petersfield (GB); George Bolt, Midhurst (GB)

(73) Assignee: Neural Technologies, Ltd., Petersfield (GB)

( * ) Notice: Subject to any disclaimer, the term of this patent is extended or adjusted under 35 U.S.C. 154(b) by 0 days.

(21) Appl. No.: 11/874,140

(22) Filed: Oct. 17, 2007

(65) Prior Publication Data
US 2008/0103999 A1    May 1, 2008

Related U.S. Application Data

(63) Continuation of application No. 11/102,590, filed on Apr. 7, 2005, now abandoned, which is a continuation of application No. PCT/AU03/001317, filed on Oct. 7, 2003.

(51) Int. Cl.
G06E 1/00 (2006.01)
G06E 3/00 (2006.01)
G06G 7/00 (2006.01)

(52) U.S. Cl. ............... 706/17; 706/14; 706/15; 706/16

(58) Field of Classification Search ............ None
See application file for complete search history.

(56) References Cited

U.S. PATENT DOCUMENTS

| | | | |
|---|---|---|---|
| 5,195,170 A | | 3/1993 | Eberhardt |
| 6,401,082 B1 * | | 6/2002 | Kropas-Hughes et al. ..... 706/26 |
| 6,650,779 B2 * | | 11/2003 | Vachtesvanos et al. ...... 382/228 |
| 7,117,188 B2 * | | 10/2006 | Guyon et al. .................. 706/20 |
| 2003/0051026 A1 * | | 3/2003 | Carter et al. ................. 709/224 |
| 2003/0154175 A1 * | | 8/2003 | Shi et al. ..................... 706/31 |
| 2004/0138933 A1 * | | 7/2004 | LaComb et al. ............... 705/7 |

OTHER PUBLICATIONS

Christian Hillbrand et al., Using Artificial Neural Networks to prove hypothetic cause and effect, 2002, Proceedings of ICEIS 2002, 1-7.*
Kishab Mehrotra et al., Elements of Artificial Neural Networkd, 1997, MIT Press, 2, 3, 9, 14, 20, 25, 26, 44, 46-50, 66, 142, 188.*

(Continued)

*Primary Examiner*—Joseph P Hirl
(74) *Attorney, Agent, or Firm*—Knobbe Martens Olson & Bear LLP (57) ABSTRACT

A neural model for simulating a scorecard comprises a neural network for transforming one or more inputs into an output. Each input of the neural model has a squashing function applied thereto for simulating a bin of the simulated scorecard. The squashing function includes a control variable for controlling the steepness of the response to the squashing function's input so that during training of the neural model the steepness can be controlled. The output of the neural model represents the score of the simulated scorecard. The neural network is trained to behave like a scorecard by providing plurality of example values to the inputs of the neural network. Each output score produced is compared to an expected score to produce an error value. Each error value is back-propagated to adjust the neural network transformation to reduce the error value. The steepness of each squashing function is controlled using the respective control variable to affect the response of each squashing function.

25 Claims, 3 Drawing Sheets

OTHER PUBLICATIONS

Hand, David J. & Adams, Niall M., "Defining Attributes for Scorecard Construction in Credit Scoring", *Journal of Applied Statistics*, vol. 27, No. 5, 2000, pp. 527-540.

Fukuoka et al., "A modified back-propagation method to avoid false local minima", *Neural Networks* (1998) 11(6):1059-1072.

Kirkpatrick et al., "Optimization by simulated annealing", *Science* (1983) 220(4598):671-680.

Thomas, "A survey of credit and behavioural scoring: forecasting financial risk of lending to consumers", *International Journal of Forecasting* (2000) 16(2):149-172.

Supplementary European Search Report issued on Apr. 3, 2009 in European Patent Application No. EP 03 74 7714.

* cited by examiner

| Record | Binning | Bin boundaries | Scores | Result |
|---|---|---|---|---|
| Current_account <0DM | → | <0DM | 5 | → 5 |
| | | <200DM | 31 | |
| | | >=200DM | 26 | |
| | | None | 54 | |
| Duration 6 | → | 4 to 15 | 86 | → 86 |
| | | 16 to 24 | 67 | |
| | | 25 to 39 | 50 | |
| | | 40 to 59 | 33 | |
| | | 60 to 72 | 9 | |
| Credit_history Critical | → | Bank_credits_paid | 36 | |
| | | Critical | 100 | → 100 |
| | | None/paid | 10 | |
| | | Past_delays | 78 | |
| | | Up_to_date | 55 | |
| Loan_purpose Radio/TV | → | Business, Education, Retraining | 61 | |
| | | Car_new | 8 | |
| | | Car_used | 79 | |
| | | Furniture, Radio/TV | 47 | → 47 |
| | | Domestic_appliance, Other, Repairs | 54 | |
| Credit 1172 | → | 250 to 2999 | 41 | → 41 |
| | | 3000 to 5999 | 28 | |
| | | 6000 to 9999 | 16 | |
| | | 10000 to 16000 | 4 | |
| Total | | | | 279 |

*PRIOR ART*

CONVERGENT CONSTRUCTION OF TRADITIONAL SCORECARDS

RELATED APPLICATIONS

This application is a continuation application of U.S. application Ser. No. 11/102,590, filed on Apr. 7, 2005, titled: CONVERGENT CONSTRUCTION OF TRADITIONAL SCORECARDS, publication number 2005-0273449 A1, published on Dec. 8, 2005, now abandoned, which is a continuation application, and claims the Benefit under 35 U.S.C. §§ 120 and 365 of PCT Application No. PCT/AU03/001317, filed on Oct. 7, 2003 and published Apr. 15, 2004, in English, which are hereby incorporated by reference.

FIELD OF THE INVENTION

The present invention relates to simulation of scorecards using a neural network.

BACKGROUND

Figure 1:
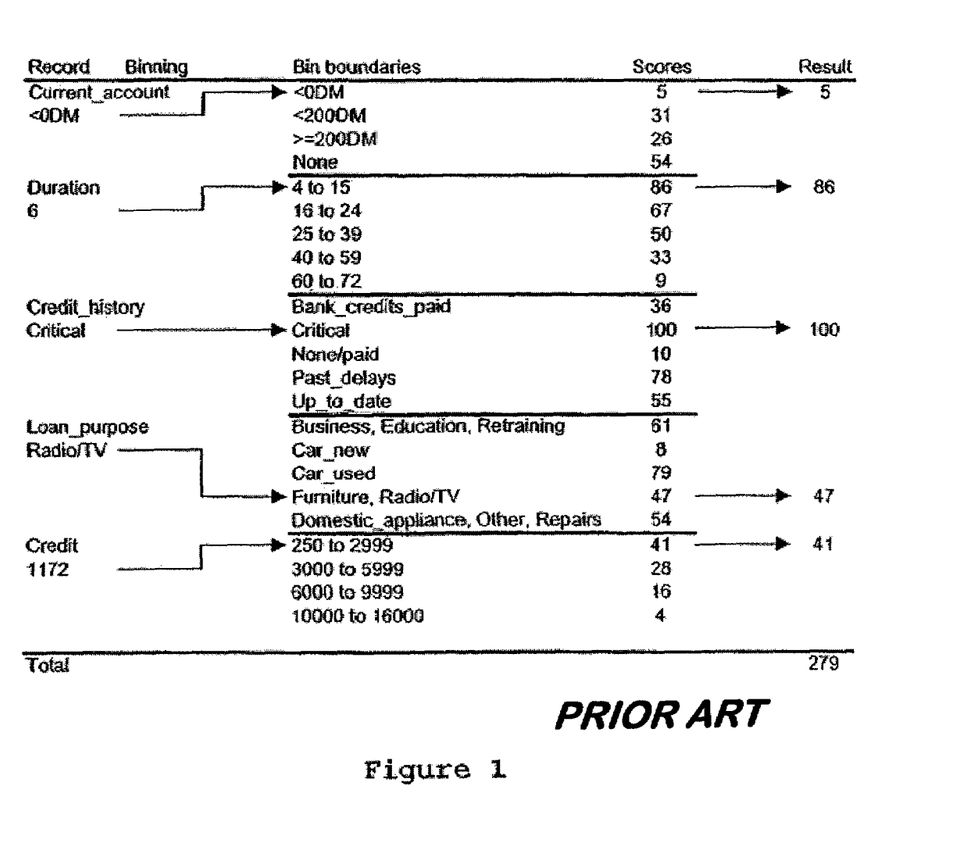
FIG. 1 is an example of a prior art scorecard.

Traditional scorecards take a collection of input fields and produce a score to predict the likelihood of some event. Each input is binned according to the stated range of that bin. For a numeric field such as age, these bins are arranged consecutively. For a categorical field such as employment type, each category could be regarded as a bin in its own right, or several categories could be grouped together into a single bin. Each bin has an associated score. The scores for the selected bins for every field are summed to produce the overall score of the scorecard. An example of a traditional scorecard is shown in FIG. 1.

If a set of examples is available where the outcome is known, then analytical routines may be applied to generate the bin ranges and scores automatically. The outcome is encoded as a binary field to indicate either a positive or negative outcome. This then constitutes the target field for the analytical routines.

Neural techniques can use examples of inputs and targets to build models to estimate those targets. This model building proceeds iteratively by first initialising the model arbitrarily and then: presenting a number of examples, evaluating the model's resulting performance, altering the model to improve its performance, and then repeating this step until the required performance is achieved. This process is referred to as training the model. Model training converges to a solution that takes into account the whole problem including the interaction between fields and non-linear relationships between target and input. Many such neural models have been invented.

These aspects of neural models are worth utilising in a procedure for the automatic creation of traditional scorecards. However, it is difficult to apply neural training techniques to traditional scorecards because the bin boundaries make the traditional scorecard function discontinuous.

The present invention attempts to overcome these problems by approximating a traditional scorecard using a neural model.

SUMMARY OF THE INVENTION

According to a first aspect of the present invention there is provided a neural model for simulating a scorecard comprising:
a neural network for transforming one or more inputs into an output, each input of the neural model having a squashing function applied thereto for simulating a bin of the simulated scorecard, wherein the squashing function includes a control variable for controlling the steepness of the response to the squashing function's input so that during training of the neural model the steepness can be controlled, the output of the neural network representing the score of the simulated scorecard.

Preferably each input to the neural network represents a field with each field having one or more bins associated therewith.

Preferably the bins associated with the same field have the same control variable for controlling the response of the respective squashing functions. Preferably the control variable associated with each field is independent of the control variable associated with the other fields.

Preferably each bin associated with the same field has a different offset applied to the input of the associated squashing function to differentiate one bin from another.

Preferably one of the input fields is numeric. Preferably one of the input fields is categoric. Preferably categoric input fields are encoded into binary inputs. Preferably the categorical input fields are hard coded into binary inputs. Alternatively the categorical input fields are soft coded into binary inputs and post processed to provide a cut off for bin membership.

Preferably the neural network is arranged so that the squashing function steepness is of a low value during initial training and adjusted to be of a high value as the neural model reaches a state where the neural model behaves as the simulated scorecard.

Preferably a neural network is a multi-layered perceptron. Preferably the squashing function is a sigmoid function. Preferably the squashing function uses the following formula:

$$y = 1/(1+\exp(-Tx))$$

where
y is the result of the squashing function,
x is an input to the neural network,
T is the steepness control variable.

Preferably the score is calculated using the following formula:

$$y_{num} = \sum_i \Delta s_i / (1 + \exp(-T(x - \beta_i))),$$

where
$y_{num}$ is the score,
i is a count variable for the number of bins,
$\beta_i$ is a bias of the ith bin boundary,
$\Delta s_i$ is an amount added to the score by moving from bin i−1 to bin i.

According to a second aspect of the present invention there is provided a method of training a neural network to behave like a scorecard, the neural network having one or more inputs and configured to transform the inputs into one or more outputs, each input having a squashing function applied thereto, each squashing function having a control variable for controlling the steepness of the response to the input of the squashing function, said method comprising the steps of:
providing a plurality of example values to the inputs of the neural network, each example producing an output representing a score;
comparing each score to an expected score of each example to produce an error value;

back propagating each error value to adjust the neural network transformation to reduce the error value as each example is applied to the neural model; and controlling the steepness of each squashing function using the respective control variable to affect the response of each squashing function.

Preferably each control variable is adjusted so that the respective steepness starts off low and ends high through the course of training.

Preferably the control variables are adjusted such that the respective steepness is increased relative to how close the model is to the final state. Preferably the training ends when one of the steepnesses rises above a threshold. Alternatively the training ends when all of the steepnesses rise above a threshold.

Preferably the maximum number of bins per field is defined when the neural network is initialised.

Preferably a bin boundary is removed if the disruption caused by removing the bin boundary is below a bin removal threshold. Preferably in the event that a bin boundary is removed the steepness control variable associated with that field is adjusted to decrease the steepness.

According to a third aspect of the present invention there is provided a simulated scorecard apparatus comprising:

a neural network processor arranged to receive one or more inputs, and process the inputs to produce an output representing a score;

wherein the processor is configured to operate as a neural model with a squashing function applied to each of the inputs for simulating a bin of a simulated scorecard, each squashing function including a control variable for controlling the steepness of the response to the squashing function's input, wherein the processor is configured to be trained to simulate the scorecard in a trained state, such that in the trained state each steepness is high relative to the steepness of the neural model in an untrained state.

Preferably each input to the processor represents a field of the simulated scorecard.

Preferably the processor is configured to trigger one of a plurality of bins associated with each field and depending on the bin triggered in each field allocate a score for each field. Preferably the processor is configured to sum the scores for each field to calculate the score output as the result of the simulated scorecard.

Preferably the processor is configured to apply an offset to each squashing function of each bin associated with the same field to differentiate one bin from another.

According to a fourth aspect of the present invention there is provided a trained neural model for simulating a scorecard comprising:

a neural network for transforming one or more inputs into an output representing a score;

wherein each input of the neural model has a squashing function applied thereto for simulating a bin of the simulated scorecard, the squashing function including a control variable for controlling the steepness of the response to the squashing function's input, wherein the steepness is high relative to the steepness of the neural network when it was untrained.

Preferably each input to the neural network represents a field with each field having one or bins associated therewith.

Preferably each bin associated with the same field has a different offset applied to the input of the associated squashing function to differentiate one bin from another, whereby the output is allocated to the appropriate bin for that field.

DESCRIPTION OF THE DIAGRAMS

In order to provide a better understanding, preferred embodiments of the present invention will be described, by way of example only, with reference to the accompanying diagrams, in which.

DESCRIPTION OF PREFERRED EMBODIMENTS

In the example of a traditional scorecard shown in FIG. 1, the first column contains the record details: field name and value. The binning column shows an arrow indicating to which bin the field value is placed. The bin boundaries column gives the definition of each bin. The scores column gives the scores attached to each bin. The result column gives the scores that were selected by the binning. The total score is given by the final row.

Traditional scorecards do not overtly look like neural models.

One of the most commonly used neural models, the multi-layered perceptron (MLP) uses layers of nodes that perform a linear transform of its inputs followed by a 'squashing' function. A particularly popular squashing function is the logistic sigmoid function:

$$y=1/(1+\exp(-x))$$

This function has its steepest response to its input at the input's origin, and tails off either side towards zero-gradient. Other squashing functions will suffice provided that they have asymptotes that are scaled into the range 0 to 1, and are symmetric about the origin. The steepness of this function can be controlled by applying a scalar multiplier to the input:

$$y=1/(1+\exp(-Tx))$$

where T is, a control variable of the steepness of the reaction of the squashing function to the input, which is by analogy with physical annealing processes, inversely proportional to the temperature of the system.

This allows the shape of this function to be altered from a smooth and gentle increase towards a function arbitrarily close to a step function. This means that an MLP architecture exists that will approximate to arbitrary accuracy any sequential function that can be built out of step functions and linear transforms. In particular high temperatures produce a gentle response and low (cool) temperatures produce a steep response.

Through offsets on the step function input, a sequence of step functions can generate the functionality of a traditional scorecard. How this is done varies with each input field depending on its type. For numeric fields this is achieved using:

$$y_{num} = \sum_i \Delta s_i step(x - \beta_i),$$

where $\Delta s_i$ is the amount added to the score by moving from bin i−1 to bin i, and $\beta_i$ is the step function bias used as a bin boundary.

Replacing this step function with the squashing function gives:

$$y_{num} = \sum_i \Delta s_i / (1 + \exp(-T(x - \beta_i))).$$

Figure 2:
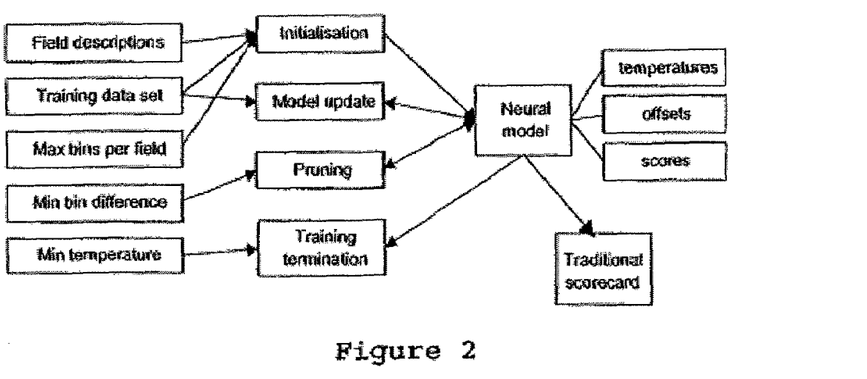
FIG. 2 is a schematic representation of a preferred embodiment of a system diagram for performing the present invention.

This formula for the squashing function can form the basis of the present invention represented as simulated scorecard apparatus 10, in FIG. 2, which includes a neural model 12, and initialisation means 14, a model updating means 16, a bin pruning means 18, a training termination decision processor 20, storage means for controlling variables 22, storage means for controlling further variables 24 and traditional scorecard 26.

The apparatus 10 may be performed as hardware or a computer programmed with appropriate software to operate as a neural model with each input of the neural model having a squashing function applied to it. The squashing function handles numeric fields well, however categorical fields must be transformed to enable the squashing function to operate.

For categorical fields (such as employment type), the field is I-of-N encoded so that the single categorical field of N categories is turned into N inputs of binary information, with each binary indicating whether its category is present. These N inputs are linearly transformed into M values where M is the number of groups to place the categories into. The linear transformation can achieve a required grouping without further processing, for example, categories A,B,C,D can be put into groups a,b,c by grouping categories B and C together using the transform:

$$\begin{pmatrix} a \\ b \\ c \end{pmatrix} = W \begin{pmatrix} A \\ B \\ C \\ D \end{pmatrix}, W = \begin{pmatrix} 1 & 0 & 0 & 0 \\ 0 & 1 & 1 & 0 \\ 0 & 0 & 0 & 1 \end{pmatrix}.$$

This is a hard-grouping in that the categories are definitely assigned to a particular bin. This makes it difficult to incorporate into a neural model. However, the transform can also represent soft grouping of categories by using intermediate values between 0 and 1 to indicate that a category can weakly belong to several bins. To achieve this, the results of the transform are post-processed by an approximated step function to provide a cut-off for membership of a bin. This combines to give the calculation of a categorical field's contribution to the overall score of:

$$y_{cat} = \sum_{group} \left( s_{group} / \left( 1 + \exp\left( -T \sum_{cat} w_{group,cat} x_{cat} \right) \right) \right)$$

where $s_{group}$ is the score given to that group, T is the inverse temperature, $w_{group,cat}$ is the element from the linear transform matrix and $X_{cat}$ is element of the 1-of-N encoded input corresponding to the category cat.

The sum of score contributions from each field produces the score for the whole scorecard based on the input fields.

Figure 3:
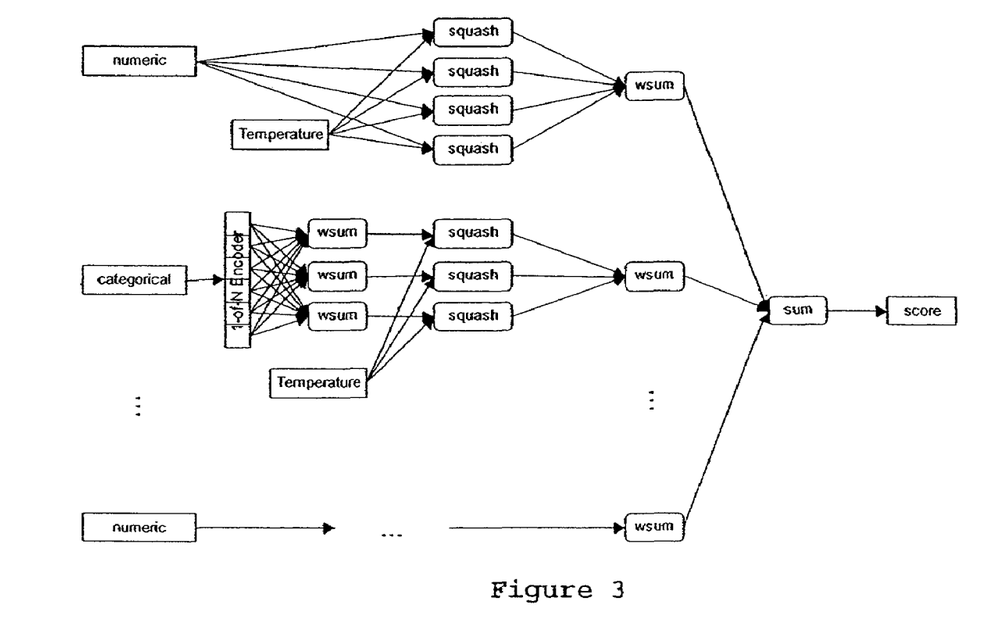
FIG. 3 is a schematic representation of a preferred embodiment of a model architecture of the present invention.

The architecture of the neural model is graphically shown in FIG. 3. This architecture will process a number of input fields, each of which will first be classified as numeric or categorical. The diagram shows the processing applied to each type of input, with details shown for two inputs only, the types for which were selected in no meaningful order. In actual implementation, several fields of each type may be used, each with its own set of temperatures, weighted-summations and squashing functions.

The numeric field 30 is provided to squashing functions 32 which receive temperature value 34. Each squashing function has a different offset to represent each respective bin for that field. The results of the squashing functions are summed by weighted sum unit 36 and its output provided to summing unit 38.

Categorical field 40 is encoded by code unit 42 into a binary value where each place in the binary value is summed to approximate a cut off function for membership to a bin by weighted summing units 44. Squashing functions 46 are applied with the steepness controlled by temperature 48. Again each squashing value is biased to represent one of the bins. The outputs from the squashing functions 46 are summed by weighted sum unit 50 to produce a score provided to summing unit 38. Other fields are included such as numeric field 52 which are again summed by weighted summing unit 54 and also provided to summing unit 38. Summing unit 38 accumulates all of the sums provided to it as the final score of the simulated scorecard.

The squashing functions 32 & 46 carry out the operation:

$$y = \sum_i \Delta s_i / (1 + \exp(-T(x - \beta_i))),$$

where T is the inverse temperature input.

The weighted sum functions 36, 44 and 54 carry out the operation:

$$y = \sum_i w_i x_i$$

where $w_i$ is a scalar value indicating the strength of that input's contribution to the sum.

The sum function 38 carries out the operation:

$$y = \sum_i x_i$$

The temperature has the effect of controlling the rounding off of the bin boundaries. Soft, poorly defined bin boundaries are "hot" and amenable to change, whereas sharp, step-like bins are "cold" and static. The scorecard is initially trained in its hot state using neural techniques, and the bins are then gradually cooled until the model behaves as a traditional scorecard.

Figure 4:
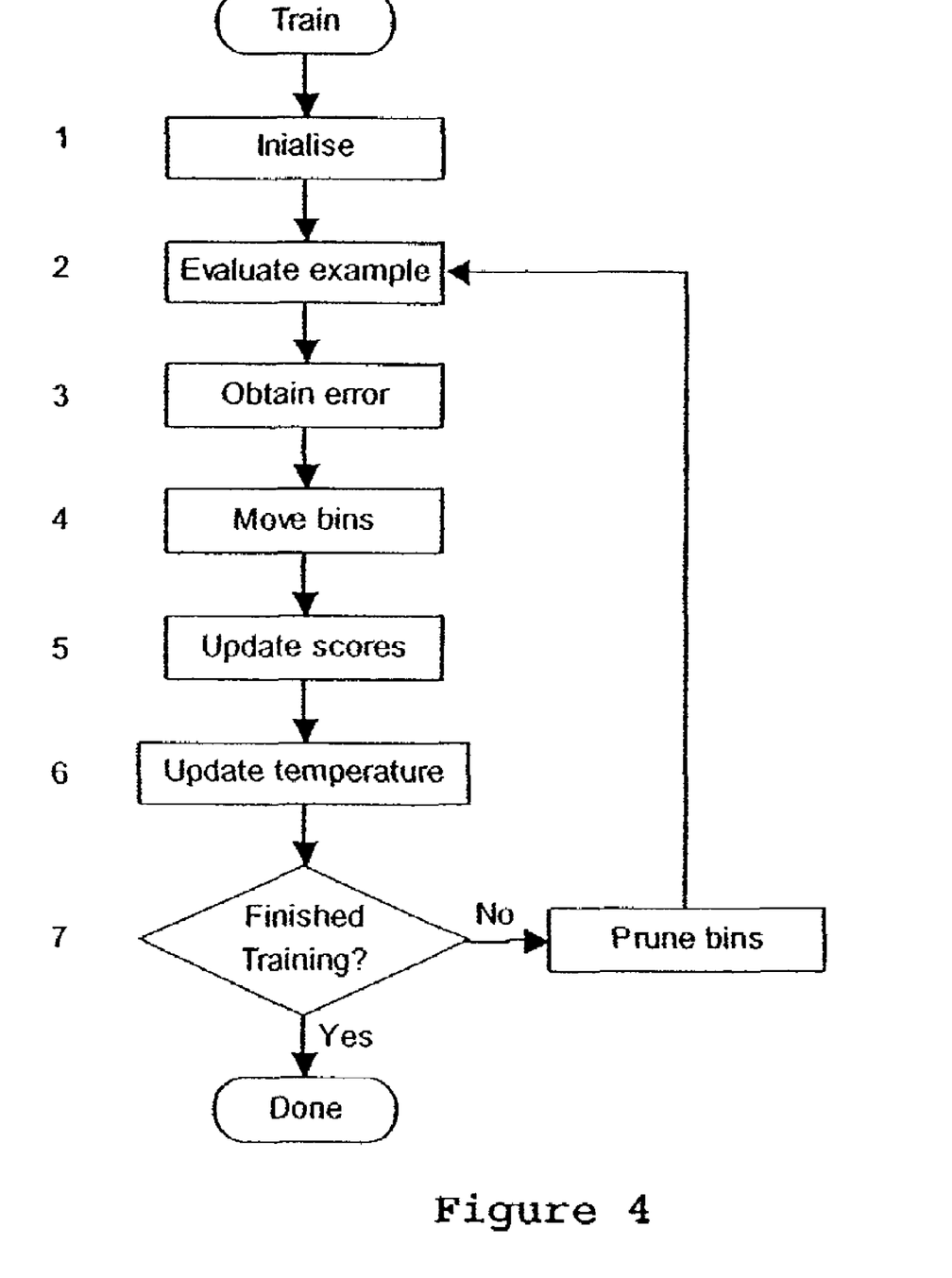
FIG. 4 is a preferred form of a flow chart for applying the training process of the present invention.

The training procedure is outlined in FIG. 4.

Initialisation

The initialisation means 14 initialises the neural model 12 at (Step 1) and assigns a maximum allowed number of bins to every field. These bins are pruned down in a later step during training to an appropriate number. For numeric fields, the maximum number is provided by the user. The location of these bins is set to provide an even distribution of examples across those bins. For categorical fields, a bin is created for every category up to the bin limit set by the user. If in excess of the bin limit, then the number of bins is set to that limit and the categories are grouped into these bins at random. The initial variables are stored in storage means 22. The temperature of the squashing functions are initially set high by giving T a small value such as 0.1.

Credit Assignment

Each example is passed through the model 12 using offsets and temperatures in storage means 24 to get a score which is stored in storage means 24 (Step 2). This score is compared to the actual outcome of the scorecard 26 for that example to work out whether the score should have been higher or lower (Step 3). The model updating means 16 back-propagates this error through the model using standard MLP calculations to obtain errors for all trainable parameters: bin scores, numeric bin boundary locations and categorical bin assignments. The scores and bin definitions are adjusted to decrease this error using gradient descent (Steps 4 and 5). Other optimisation techniques could be used such as scaled-conjugate gradients.

A winner-takes-all extra error term is added to the categorical field training to ensure that when groups are closely competing over the same category, there will be only one winner. This is implemented using an ideal group assignment that places the category in the group it is most strongly associated with and setting the error to the difference between the actual assignment and this ideal.

Controlling the Cooling Rate

During the training, the model temperature needs to be steadily decreased in step with how close the model is to its final state. (In other words the steepness of the response is increased at it is trained.) If the model is cooled too fast, then the bin boundaries will not have settled down before becoming frozen in position. This will produce a poor performing scorecard. If the model is cooled too slowly then the algorithm becomes inconvenient to use. On top of this, pruning bins may require that other bins adjust themselves to compensate, requiring a temporary warming. The cooling rate will be dependent on the nature of the data used to train the scorecard on, and cannot be judged beforehand. It is only once the training has begun that the appropriate cooling rate can be found.

The cooling rate is controlled such that the bins sharpen as their positions have stabilised (Step 6). Each input field is given its own temperature, which may be changed independently of the other fields. Within each field, all constituent temperature parameters are shared. Each bin boundary or assignment will move during training. As training begins, this movement is likely to be in one direction as the bin boundary or assignment seeks its resting places. Once the model settles down, these movements will become more random as the bins find their resting place. The bin movements are watched by the termination decision processor 20 to see whether they are moving in a co-ordinated fashion and the temperature increased if they are, otherwise the temperature is decreased.

The temperature, which is inversely proportional to the steepness control parameter T is used to judge when to stop training (Step 7). Once all the fields have cooled to below a predefined threshold, then the neural model is judged as having stabilised. The steepness parameter T may end at about 10. This amount may be used as the threshold, but it will typically be in the rage of 5 to 100. It can be seen that this is much larger than the initial value of 0.01, and hence corresponds to a much lower temperature.

Bin Pruning

The generated scorecard should only contain the minimum number of bins that it needs. The bin pruning means 18 achieves this by removing bin boundaries during training according to which the least disruption to the accuracy the model will result (Step 8). Training continues afterwards so that the model can take steps to mend itself of the unavoidable disruption that does occur as a result of bin pruning.

To work out what effect a bin or bin boundary removal will have on the accuracy of the model, each bin retains a measure of the proportion of examples that lie within its range. It then works out what the new scores for these examples would be, and totals up the overall change. If the total change is below a pre-set threshold, that bin or bin boundary is removed.

The skilled addressee will realise that modifications and variations may be made to the present invention without departing from the basic inventive concept. Such modifications may include adding constraints so that the output changes monotonically with respect to any input. This could be achieved by restricting the $\Delta s_i$ for an input to be positive (to produce positive monotonicity) or negative (to produce negative monotonicity).

Those modifications and variations that would be apparent to the skilled addressee are intended to fall within the scope of the present invention, the nature of which is to be determined by the foregoing description and appended claims.

The invention claimed is:

1. A trainable neural network which is able to undergo training so as to result in a trained neural network operable as a scorecard, comprising:
   a transformation layer transforming one or more received inputs into an output score, wherein the transformation layer is trainable so that when trained the score is determined according to the one or more inputs according to the training;
   wherein the transformation layer comprises a computing component for each input applying one or more squashing functions to the respective input, each squashing function simulating a scorecard bin and having a control variable for controlling the steepness of a response by the squashing function to the respective input;
   wherein each computing component is configured so that during training the respective control variable is varied, and at the completion of the training the respective control variable is fixed.

2. A neural network according to claim 1, wherein each computing component is configured so that the variation of each control variable is such that the steepness of the respective squashing function is gradually increased, until a modification occurs to one or more bins associated with one of the inputs, whereupon for those squashing functions associated with the one of the inputs has the control variable varied so that the steepness of the respective squashing function is decreased.

3. A neural network according to claim 1, wherein those squashing functions associated with the same input have the same control variable for controlling the steepness of the response to the respective input.

4. A neural network according to claim 3, wherein the control variable of one input is independent of the control variable of the other inputs.

5. A neural network according to claim 1, wherein each computing component is applying a different offset to the input for each bin prior to the application of the associated squashing function so as to differentiate one bin from another.

6. A neural network according to claim 1, wherein one of the inputs is categorical, and the categorical input is encoded into binary inputs to the one or more squashing functions.

7. A neural network according to claim 6, wherein the categorical input is hard coded into binary inputs to the one or more squashing functions.

8. A neural network according to claim 6, wherein the categorical input is soft coded into binary inputs to the one or more squashing functions and post processed to provide a cut off for bin membership.

9. A neural network according to claim 1, wherein the transformation layer is arranged so that the control variable is of a low value at the start of training and is adjusted to be of a high value when training is finished.

10. A neural network according to claim 1, wherein the score is calculated using the following formula:

$$y_{num} = \sum_i \Delta s_i / (1 + \exp(-T(x - \beta_i))),$$

where
$y_{num}$ is the score,
i is a count variable for the number of bins,
x is a an input to the neural network,
T is the steepness control variable,
$\beta_i$ is a bias of the ith bin boundary, and
$\Delta s_i$ is an amount added to the score by moving from bin i-1 to bin i.

11. A method of configuring a neural network to behave like a scorecard, the neural network comprising a transformation layer transforming one or more inputs into an output representing a score, wherein each input has one or more squashing functions applied thereto, each squashing function simulating a scorecard bin and having a control variable for controlling the steepness of a response by the squashing function to the respective input, the method comprising:
training the neural network, wherein during training the steepness of each control variable is varied and upon completion of the training each control variable is fixed.

12. A method according to claim 11, wherein each control variable is adjusted so that the respective steepness starts off low and ends high through the course of training the neural network.

13. A method according to claim 11, wherein the control variables are adjusted such that the respective steepness increases relative to how close the network is to a final trained state.

14. A method according to claim 11, wherein the training ends when one of the control variables rises above a threshold.

15. A method according to claim 11, wherein the training ends when all of the control variables rise above a threshold.

16. A method according to claim 11, wherein the number of bins associated with each input is defined when the training begins and the number of bins associated with each input is varied during training.

17. A method according to claim 16, wherein the number of bins is reduced by combining two adjacent bins if the disruption caused by removing a bin boundary between said adjacent bins is below a bin removal threshold.

18. A method according to claim 17, wherein in the event that a bin boundary is removed the control variable associated with an input associated with the combined bins is adjusted to reduce the steepness.

19. A trained neural network operating as a scorecard, comprising:
one or more receivers receiving one or more inputs;
an output; and
a transformation layer configured to transform the one or more inputs into a score provided to the output according to training conducted on the transformation layer,
wherein the transformation layer comprises a computing component for each input, each computing component configured such that a number of squashing functions are applied to the respective input, each squashing function simulating a scorecard bin and having a control variable for controlling the steepness of a response by the squashing function to the respective input,
wherein the transformation layer has been trained so that each control variable is fixed to a value as a result of training the transformation layer, wherein during training each control variable was varied and at the completion of the training the control variable of each input was fixed.

20. A neural network according to claim 19, wherein the number of squashing functions applied to each input is independent of the number of squashing functions applied to the other inputs and is determined as a result of training the neural network.

21. A neural network according to claim 20, wherein the transformation layer is triggering one of the one or more bins associated with each input and depending on which bin is triggered a contribution is made to the score.

22. A neural network according to claim 21, wherein the transformation layer is summing the score contributions to calculate the score output as the result of the simulated scorecard.

23. A neural network according to claim 20, wherein each computing component is applying a different offset to the input for each bin prior to application of the associated squashing function so as to differentiate one bin from another.

24. A neural network according to claim 19, wherein each computing component is applying a different scaling factor to the result of the squashing function for each bin so as to produce a different value according to the bin in which the input is simulated to fall within.

25. A system for training a neural network to behave like a scorecard, wherein the neural network is transforming one or more inputs into an output representing a score determined according the inputs, wherein each input has one or more squashing functions applied thereto, each squashing function for simulating a scorecard bin and having a control variable for controlling the steepness of a response by the squashing function to the respective input, the system comprising:
a controller for varying the steepness of each control variable during training of the neural network and upon completion of the training causing each control variable to be fixed.

* * * * *

UNITED STATES PATENT AND TRADEMARK OFFICE
CERTIFICATE OF CORRECTION

| | | |
|---|---|---|
| PATENT NO. | : 7,577,624 B2 | Page 1 of 1 |
| APPLICATION NO. | : 11/874140 | |
| DATED | : August 18, 2009 | |
| INVENTOR(S) | : Peacock et al. | |

It is certified that error appears in the above-identified patent and that said Letters Patent is hereby corrected as shown below:

At Column 2, Line 8, delete "Networkd," and insert therefore, --Networked,--.

At Column 5, Line 28, delete "I-of-N" and insert therefore, --1 of-N--.

At Column 9, Line 26, delete "a an" and insert therefore, --an--.

At Column 10, Line 9, delete "configured to transform" and insert therefore, --transforming--.

At Column 10, Line 52, delete "according the" and insert therefore, --according to the--.

Signed and Sealed this

Twenty-third Day of February, 2010

David J. Kappos
*Director of the United States Patent and Trademark Office*